A (12) United States Patent
Meunier

(10) Patent No.: US 7,120,540 B2
(45) Date of Patent: Oct. 10, 2006

(54) ONBOARD TERRAIN ANTICOLLISION DISPLAY DEVICE

(75) Inventor: Hugues Meunier, Frouzins (FR)

(73) Assignee: THALES, Neuilly sur Seine (FR)

( * ) Notice: Subject to any disclaimer, the term of this patent is extended or adjusted under 35 U.S.C. 154(b) by 0 days.

(21) Appl. No.: 10/539,619

(22) PCT Filed: Dec. 2, 2003

(86) PCT No.: PCT/EP03/50924

§ 371 (c)(1),
(2), (4) Date: Jun. 17, 2005

(87) PCT Pub. No.: WO2004/055477

PCT Pub. Date: Jul. 1, 2004

(65) Prior Publication Data

US 2006/0074559 A1 Apr. 6, 2006

(30) Foreign Application Priority Data

Dec. 17, 2002 (FR) .................................. 02 16001

(51) Int. Cl.
*G06F 17/10* (2006.01)
(52) U.S. Cl. ........................... 701/301; 701/208; 701/5
(58) Field of Classification Search .................... 701/1, 701/3, 5, 9, 10, 11, 14, 16, 17, 18, 207, 208, 701/209, 210, 211, 212, 300, 301; 340/940, 340/979
See application file for complete search history.

(56) References Cited

U.S. PATENT DOCUMENTS 6,567,728 B1 * 5/2003 Kelly et al. ..................... 701/9
6,690,299 B1 * 2/2004 Suiter ......................... 340/973
6,737,987 B1 * 5/2004 Conner et al. .............. 340/946
6,833,797 B1 * 12/2004 Ishihara ....................... 340/946
6,906,641 B1 * 6/2005 Ishihara ....................... 340/946
6,965,816 B1 * 11/2005 Walker ......................... 701/16

FOREIGN PATENT DOCUMENTS

FR 2813963 A 3/2002

* cited by examiner

*Primary Examiner*—Richard M. Camby
(74) *Attorney, Agent, or Firm*—Lowe Hauptman & Berner LLP.

(57) ABSTRACT

Terrain anticollision equipment generally uses a display device showing a two-dimensional synthetic map of the terrain overflown by the aircraft and in which the relief is shown by superposed slices assigned false colors representative of the magnitude of the risk of collisions. The allocation of the false colors and/or the positions of the slices is referenced with respect to a reference display altitude related to the instantaneous altitude of the aircraft or to a short term forecast altitude for the aircraft, each of the referencings having its own advantages as a function of the situation in progress for the aircraft. Here it is proposed that the reference display altitude be made to vary, with gentle transitions, with no visible jerks on the screen, as a function of the aircraft's situation deduced from the flight parameters so as to have, at any moment for the crew, the most pertinent possible and the most useful possible map having regard to the instantaneous situation vis à vis the risks of collision.

16 Claims, 6 Drawing Sheets

ONBOARD TERRAIN ANTICOLLISION DISPLAY DEVICE

CROSS-REFERENCE TO RELATED APPLICATIONS

The present Application is based on International Application No. PCT/EP2003/050924, filed on Dec. 2, 2003, which in turn corresponds to FR 02/16001 filed on Dec. 17, 2002, and priority is hereby claimed under 35 USC §119 based on these applications. Each of these applications are hereby incorporated by reference in their entirety into the present application.

FIELD OF THE INVENTION

The present invention relates to the prevention of aeronautical accidents in which a still maneuverable aircraft crashes with the ground. This type of accident, which represents a significant percentage of past civil air catastrophes, is known in the technical literature by the initials CFIT standing for "Controlled Flight Into Terrain".

DESCRIPTION OF RELATED ART

To combat the risks of CFIT various ground proximity alert equipment has been introduced onboard aircraft.

A first generation of ground proximity alert equipment called GPWS (the acronym standing for "Ground Proximity Warning System") monitors the height of the aircraft above the ground as measured by a radio altimeter and cross-checks it:

- either with the vertical descent speed of the aircraft as measured by a barometric altimeter and/or an inertial rig, the cross-check being done by simple comparison (mode 1) or, in a more sophisticated manner, by non-linear filtering (mode 2),
- or with an earlier measurement of the height above the ground so as to signal abnormal loss of altitude during a take-off or a missed approach (mode 3),
- or with the air speed of the aircraft and the positions of the landing gear and the flaps (mode 4),
- or with the vertical error of presentation of the aircraft in the guidance beam of an ILS (the acronym standing for "Instrument Landing System") during a landing (mode 5),
- or with the position of the aircraft in proximity to a runway (call-out) or with the angle of roll,
- or again with the angle of roll, to trigger an audible and/or visual alert in the cockpit in the case of detection of dangerous closeness to the ground.

Despite this first generation of GPWS equipment the percentage of aeronautical accidents of CFIT type has remained high, essentially, for the following reasons:

- ground proximity alerts late or even missing due to the very principle of the detection of risks of collision with the ground by a radio probe looking under the aircraft and not in front of the aircraft,
- ground proximity alarm missing following a temporary reduction, by the crew, of the sensitivity of the GPWS equipment with a view to limiting false alarms. Such is generally the case for accidents occurring during a final approach to a landing field,
- ground proximity alert late since the thresholds for triggering the GPWS equipment have been momentarily raised again to limit the false alarms during a final approach to a landing field,
- ground proximity alert in time but the crew has reacted too late or has not reacted on account of a desensitization of the equipment resulting from the overly high rate of false alarms, due mainly to a prediction of risk of collision each time that terrain begins to rise under the aircraft in a dangerous manner or otherwise.

The need to improve this first generation ground alert GPWS equipment has therefore rapidly made itself felt. The path followed has been that of increasing the information taken into account by the ground alert equipment relating to the terrain situated in front of and to the sides of the short term scheduled trajectory of the aircraft by profiting from the advent of accurate positioning systems such as satellite-based positioning systems and digitized relief maps that can be stored in onboard data bases.

To meet this need for improvement, a second generation of ground proximity alert equipment called TAWS (the acronym standing for "Terrain Awareness Warning System") has appeared, fulfilling, in addition to the customary GPWS functions, an additional function of predictive alert of risks of collision with the relief and/or ground obstacles called FLTA (the acronym standing for "predictive Forward-Looking Terrain collision Awareness and alerting") or else GCAS (the acronym standing for "Ground Collision Avoidance System"). This FLTA function consists in providing the crew of an aircraft with prealerts and alerts whenever the short term scheduled trajectory of the aircraft meets the relief and/or an obstacle on the ground so that an avoidance maneuver is engaged.

The short term scheduled trajectory of the aircraft is provided by the navigation equipment of the aircraft from a measurement, in three dimensions, of the instantaneous position and of the speed vector of the aircraft, given by an onboard positioning system, typically: satellite-based positioning receiver and/or inertial rig. The relief and/or the ground obstacles form the subject of an altimetric representation extracted from a terrain and/or obstacles data base, carried onboard the aircraft or on the ground but accessible from the aircraft by its radio communication means.

The FLTA function determines the short term scheduled trajectory of the aircraft from information provided by the navigation equipment of the aircraft, so as to delimit one or more protection volumes around the current position of the aircraft and to produce alarms of risk of collision with the relief and/or ground obstacles with each intrusion, into these protection volumes, of the relief and/or of ground obstacles overflown, modeled using an altimetric representation extracted from the terrain and obstacles data base.

An aircraft related protection volume is a part of space in which the aircraft is liable to deploy in a more or less near future. Its significance and its form depend on the delay sought between an alarm and the realization of a risk of collision, and to a certain measure on the maneuverability of the aircraft at the instant considered, that is to say on the aircraft's deployment capabilities that are related to its performance, to the modulus and to the direction of its air speed, and to its flight attitude (flight in a straight line or turn, etc). It is defined by its lower and frontal and, possibly, lateral walls.

When a risk of collision is detected by the FLTA function, it is customary to produce, intended for the crew of the aircraft, a prealarm followed by an alarm.

The aim of the prealarm is to make the crew aware of a short term risk of collision with the terrain and/or ground obstacles so that they take account thereof in the piloting of the aircraft. It is given sufficiently in advance for the crew to be able to correct its trajectory and prepare to perform a possible avoidance maneuver. It consists for example of a repetitive audible warning of the type: "Caution Terrain" twinned or otherwise with a luminous signaling and accompanied or otherwise by a specific symbology on a display screen (yellow zone for example) of the cockpit.

The alarm forewarns the crew of a very short term risk of collision with the terrain and/or ground obstacles while advising them strongly to perform an immediate avoidance maneuver, in general of "pull-up" type. This is for example a repetitive audible warning of the type: "Terrain Terrain, Pull up" that can also be twinned with a luminous signaling and accompanied or otherwise by a specific symbology on a display screen (red zone for example) of the cockpit. When a maneuver of "Pull-up" type is not deemed feasible by the system, another alarm may be emitted (for example "Avoid Terrain").

When the short term or very short term risk of collision with the terrain and/or with ground obstacles that motivated a prealarm or an alarm disappears in particular on account of the execution of an appropriate avoidance maneuver, the prealarm or the alarm is lifted and the audible and/or luminous warnings suppressed.

Such a device forms the subject of French patents FR 2 689 668, FR 2 747 492, FR 2 773 609, FR 2 813 963 and of corresponding American patents U.S. Pat. Nos. 5,488, 563, 5,638,282, 6,088,654, 6,317,663 whose descriptive content should be regarded as incorporated wholly with the present description.

It has quickly become apparent that a screen based display, of a local map of the terrain and/or of the ground obstacles, could be of great usefulness to the crew of an aircraft when they have to deal with the prealarms and alarms produced by terrain and/or ground obstacles collision alert equipment.

The display currently proposed uses one or more specific or already existing screens of the flight deck such as the screen of the weather radar whose prime function is to show the horizontal contour of the cloud formations toward which the aircraft is heading or such as the navigation screen whose main function is to display information regarding navigation and/or the flight plan of the aircraft. It consists of a two-dimensional synthetic image of the terrain overflown akin to a level curves map in which the relief is shown by superposed slices, which are assigned false colors and/or various textures and/or symbols giving them a look that is all the more alerting the larger the risk of collision.

Conventionally, the crew of an aircraft can choose between two modes of display, an absolute mode in which the superposed horizontal slices of terrain are referenced in altitude with respect to a benchmark independent of the aircraft of the sea level type or the like, this representation being termed TED (the acronym standing for: "Terrain Elevation Display") and a relative mode in which the superposed horizontal slices of terrain are referenced in altitude with respect to a benchmark dependent on the aircraft, this representation being termed THD (the acronym standing for "Terrain Hazard Display"), the two modes possibly optionally being combined.

In these representations the visible parts of the threatening slices of terrain, since they lie or will lie at altitudes close to or greater than that of the aircraft, are assigned false colors and/or various textures and/or symbols such as yellow for a horizontal slice of terrain occupying an altitude span corresponding to the current altitude of the aircraft and red for a slice of terrain occupying an altitude span greater than the current altitude of the aircraft.

The altitude taken as a reference when choosing the colors of the horizontal slices of terrain in a representation relating to the altitude of the airplane termed, hereinbelow, "reference display altitude" may be the instantaneous altitude of the aircraft or else that predicted for the aircraft at a future instant, for example 30 seconds, the altitude prediction being based on the instantaneous altitude of the aircraft and on its instantaneous speed vector or on the instantaneous altitude of the aircraft and its instantaneous vertical descent speed. Taking the short term predicted altitude for the aircraft as reference display altitude makes it possible, when the aircraft is descending, to present terrain slices as threatening even though they are below the instantaneous altitude of the aircraft and likewise, during a climb, not to present as threatening terrain slices which will be normally overflown in complete safety although they are close to or higher than the instantaneous altitude of the aircraft.

The taking, as reference display altitude, not of the measured altitude of the aircraft but of a prediction of the altitude which it will take within a short instant, makes it possible to better signal to the crew of an aircraft the true risks of collision with the terrain and/or the ground obstacles and optionally to give the crew a better awareness as to the type of avoidance maneuver to be performed in order to do away with a risk of terrain and/or ground obstacles collision signaled by a prealarm or an alarm and as to the need or otherwise to modify said avoidance maneuver for example, by a change of heading when the aircraft's climb capabilities are insufficient for upward avoidance of the terrain and/or threatening ground obstacles.

Such a viewing device has formed the subject of French patent FR 2 773 609 and of American patent U.S. Pat. No. 6,088,654 corresponding thereto.

This taking, as reference display altitude, of a prediction of the altitude that the aircraft will take in a short instant exhibits, however, limitations when an alarm of risk of collision with the terrain and/or ground obstacles is in progress. In particular, it does not make it possible to signal to an aircraft crew the instant onward of which a terrain and/or ground obstacles avoidance maneuver, instigated in an appropriate manner to deal with a risk of collision with the terrain and/or ground obstacles, may be terminated and onward of which the resumption of normal flight may be envisaged. Specifically, the crew sees the threatening layers of terrain disappear from the viewing screen as soon as the short term predicted altitude becomes, on account of the avoidance maneuver in progress, sufficiently high with respect to the terrain and/or to the ground obstacles overflown.

As it receives no end of avoidance maneuver signal on the part of the terrain and/or ground obstacles collision risks alert equipment, the crew of an aircraft wait to be appreciably above the fixed safety altitude for the zone overflown in order to end a terrain and/or ground obstacles avoidance maneuver, thereby conspiring to prolong the flight time.

The taking, as reference display altitude, of the instantaneous altitude of the aircraft makes it possible, on the other hand, for the crew of an aircraft to easily appreciate the instant at which the aircraft reaches an altitude such that a normal flight may be resumed but does not advise the crew as to the effectiveness of an avoidance maneuver in progress.

SUMMARY OF THE INVENTION

The present invention is aimed at alleviating the aforesaid drawback by giving the crew of an aircraft, by the means of one or more onboard screens, a clear indication of the instant onward of which the terrain conflict may be considered to be resolved and the avoidance maneuver may be terminated.

Its subject is a display device for terrain anticollision equipment carried onboard an aircraft detecting the risks of collision of the aircraft with the terrain and/or ground obstacles by comparison, of at least one protection envelope constructed around the short term predicted trajectory of the aircraft, with a representation of an envelope of the terrain and/or of the ground obstacles overflown and by detection of the intrusion, into the said protection envelope or envelopes, of the terrain and/or of the ground obstacles overflown. This said display device displays, on one or more screens installed onboard, an image in at least two dimensions of the envelope of the terrain and/or of the obstacles, in the form of superposed slices assigned false colors and/or various textures and/or symbols referenced with respect to a reference display altitude. It is noteworthy in that it comprises means of adjustment that vary the altitude of the reference display altitude when a risk of terrain collision is detected, with respect to an altitude related to the instantaneous altitude of the aircraft and/or with respect to a short term predicted altitude for the aircraft.

Advantageously, the means of adjustment of the reference display altitude switch instantaneously, at the moment of the detection of a risk of terrain collision, between the altitude value related to the short term predicted altitude for the aircraft and the instantaneous altitude of the aircraft.

Advantageously, the means of adjustment of the reference display altitude provide for a gentle transition, onward of the moment of the detection of a risk of terrain collision, between the altitude value related to the short term predicted altitude for the aircraft and the instantaneous altitude of the aircraft.

Advantageously, the means of adjustment of the reference display altitude give the latter, at the moment of the detection of a risk of terrain collision, the value of the short term predicted altitude for the aircraft.

Advantageously, when the aircraft was climbing or holding level at the moment of the detection of a risk of terrain collision and maintains or accentuates its climb after the detection of the risk of terrain collision, the means of adjustment of the reference display altitude fix the value of the reference display altitude at its value at the moment.

Advantageously, when the aircraft was climbing or holding level at the moment of the detection of a risk of terrain collision and attenuates its climb after the detection of the risk of terrain collision, the means of adjustment of the reference display altitude slave the reference display value to the value of the short term predicted altitude for the aircraft.

Advantageously, when the aircraft was climbing or holding level at the moment of the detection of a risk of terrain collision and begins to descend, the means of adjustment of the reference display altitude slave the value of the reference display altitude to the instantaneous value of the altitude of the aircraft.

Advantageously, when the aircraft was climbing or holding level at the moment of the detection of a risk of terrain collision and when its instantaneous altitude becomes greater than the last value taken by the reference display altitude, the means of adjustment of the reference display altitude slave the value of the reference display altitude to the instantaneous value of the altitude of the aircraft.

Advantageously, when the aircraft was descending at the moment of the detection of a risk of terrain collision and accentuates its descent after the detection of the risk of terrain collision, the means of adjustment of the reference display altitude slave the value of the reference display altitude to the value of the short term predicted altitude for the aircraft.

Advantageously, when the aircraft was descending at the moment of the detection of a risk of terrain collision and attenuates its descent after the detection of the risk of terrain collision, the means of adjustment of the reference display altitude slave the reference display value to the value of the short term predicted altitude of the aircraft.

Advantageously, when the aircraft was descending at the moment of the detection of a risk of terrain collision and begins to climb, the means of adjustment of the reference display altitude slave the value of the reference display altitude to the instantaneous value of the altitude of the aircraft.

DETAILED DESCRIPTION OF THE INVENTION

Advantageously, when the aircraft was descending at the moment of the detection of a risk of terrain collision and when its instantaneous altitude becomes less than the last value taken by the reference display altitude, the means of adjustment of the reference display altitude slave the value of the reference display altitude to the instantaneous value of the altitude of the aircraft.

Advantageously, the means of adjustment of the reference display altitude switch instantaneously, at the moment of the disappearance of a risk of terrain collision, between the altitude value related to the short term predicted altitude for the aircraft and the value of the short term predicted altitude for the aircraft.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

Other characteristics and advantages of the invention will emerge from the description below of an embodiment given by way of example. This description will be offered in conjunction with the drawing in which.

a FIG. 1 is a basic diagram of terrain anticollision equipment carried onboard an aircraft with a view to making the piloting thereof safe, a FIG. 2 is a vertical sectional view of an exemplary terrain overflown by an aircraft and of the terrain layers represented on the screen of terrain anticollision equipment carried on board, and FIGS. 3a, 3b, 3c and 3d make up a flowchart depicting exemplary logic which may be followed by a display device according to the invention for the determination of a reference display altitude after detection of a risk of terrain collision and throughout the duration of the avoidance maneuver.

Figure 1:
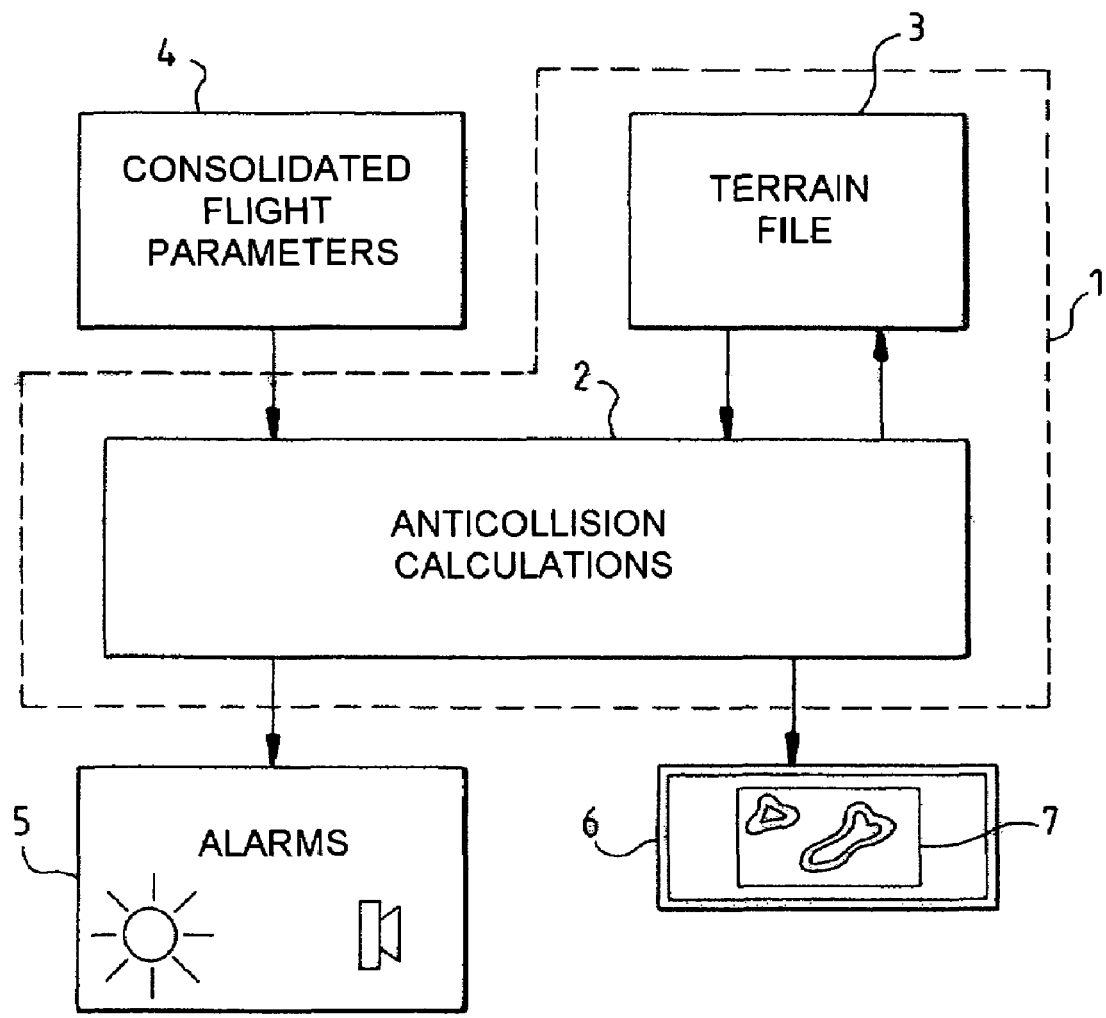
FIG. 1 shows terrain anticollision equipment 1 in its functional environment onboard an aircraft. The terrain anticollision equipment is essentially composed of a computer 2 associated with an altimetric data base 3. The altimetric data base 3 represented is carried onboard the aircraft but it could equally well be placed on the ground and accessible from the aircraft by radio transmission. The computer 2 may be a computer specific to the terrain anticollision equipment or a computer shared with other tasks such as flight management or automatic pilot. As regards the terrain anticollision, it receives from the navigation equipment 4 of the aircraft the main flight parameters including the position of the aircraft in latitude, longitude and altitude and the direction and the amplitude of its speed vector. On the basis of these flight parameters, it determines at each instant at least two protection volumes directed toward the front according to a predicted future trajectory and toward the underneath of the aircraft, and searches to ascertain whether these protection volumes come into contact with the terrain and/or the ground obstacles overflown by comparing these protection volumes with a representation of the terrain and/or of the ground obstacles overflown as derived from the altimetric data base 3, any contact being regarded as a risk of collision with terrain and/or ground obstacles. It emits a prealarm 5 as soon as the most distant of the protection volumes is touched and an alarm if the closest of the protection volumes is also touched, and accompanies the alarm with the reason for the alarm and possibly with an indication as to the suitable avoidance cue.

Additionally, to provide the crew of the aircraft with a picture of the situation of the aircraft with respect to the terrain, and, possibly, to facilitate for them the resolution of the risks of terrain collision, the terrain anticollision equipment 1 displays on a screen 6 of a map of the terrain overflown demarcating the threatening terrain zones. This two-dimensional map consists of a representation by level curves 7 of the terrain overflown with false colors and/or various textures and/or symbols depicting the magnitude of the risk of collision corresponding to each slice of terrain.

The ways in which the flight parameters are obtained by the navigation equipment 4 of the aircraft as well as the processing operations done by the computer 2 on the flight parameters and on the elements of the altimetric data base 3 to generate the prealarms, the alarms and the terrain avoidance cues and to display a map in false colors, by level curves, of the terrain overflown, will not be detailed so as not to burden the description. For particulars in regard thereto, reference may usefully be made to the abovecited patents (French patents FR 2 689 668, FR 2 747 492, FR 2 773 609, FR 2 813 963 and American patents U.S. Pat. Nos. 5,488, 563, 5,638,282, 6,088,654, 6,317,663).

The two-dimensional map, using level lines, in false colors and/or with various textures and/or symbols, of the terrain overflown, displayed by terrain anticollision equipment, is referenced in longitude and in latitude with respect to the instantaneous position of the aircraft which is placed on the screen in such a way as to favor a zone immediately under the aircraft extending in the direction of movement of the aircraft. In altitude, it may be referenced, on the choice of the crew of the aircraft, either with respect to a point of the ground (TED representation), or with respect to the aircraft (THD representation), with, in both cases, terrain layers represented in false colors and/or with various textures and/or symbols chosen as a function of the vertical distance separating the terrain layer considered from the aircraft. In both cases, the plot of the map uses a relative altitude reference with respect to the aircraft which will subsequently be referred to as the "display altitude reference" or "RefAlt" for short. This display altitude reference used, either solely for the choice of the false colors and/or of the various textures and/or of the various symbols or, at one and the same time for the delimitation of the terrain layers shown on the screen and for the choice of their false colors and/or their various textures and/or their various symbols, is often taken equal to the instantaneous altitude of the aircraft but it may also, in certain cases, be taken equal to a predicted altitude for the aircraft within a short timespan, for example, 30 seconds, assuming that it retains the same speed vector.

Figure 2:
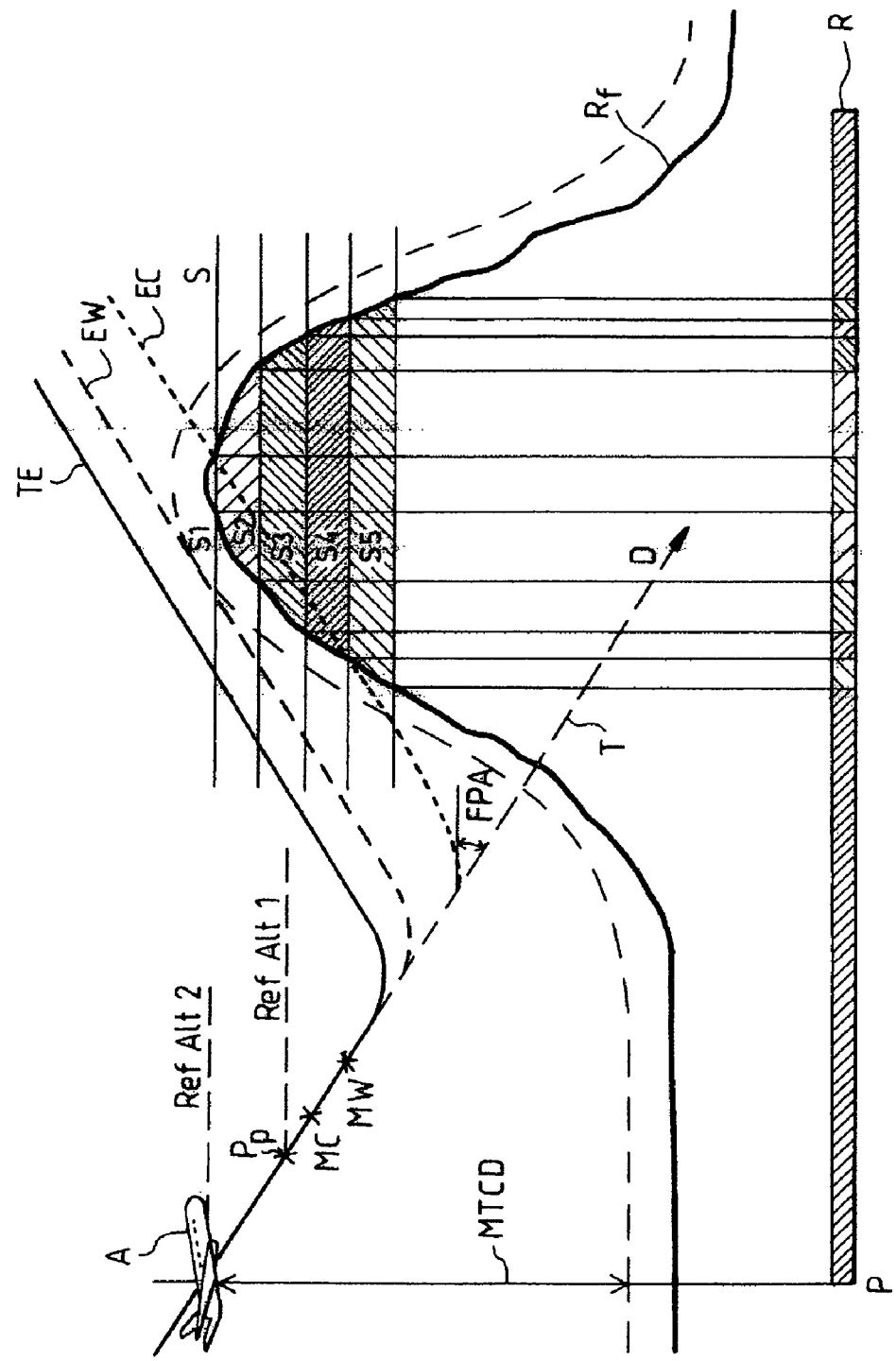

FIG. 2 is a vertical section through the relief corresponding to an exemplary map displayed on the screen 6 of terrain anticollision equipment. The zone of terrain represented on the screen 6 is a sector oriented along a radial passing through the point P of projection on the ground of the aircraft A and following on the ground the direction D of progress of the aircraft A. The terrain is sliced into horizontal layers S1, S2, S3, S4, S5, etc. for example, of a thickness, which is uniformly constant between layers or otherwise, fixed or variable over time, for example of 1000 feet referenced with respect to the level RefAlt1 corresponding to the short term predicted altitude for the aircraft A assumed to have arrived at the predicted position Pp, which altitude is chosen as mid-level of the intermediate horizontal layer S3. The horizontal layers are colored as a function of the risk of collision that they present, mimicking the red, yellow and green colors used by crossroad signals to signify a compulsory stop order, hence a danger, a permission to cross with caution, hence a risk and authorization to cross without restriction, hence an absence of risk.

The intermediate horizontal layer S3 which corresponds to the contour of the relief attaining the short term predicted altitude for the aircraft is colored in a color that is averagely attention attracting, such as a yellow of average density signaling the need to take precautions. The immediately higher layer S2 which corresponds to the contour of the relief exceeding for example by 500 feet the short term predicted altitude for the aircraft is colored in a color that is more attention attracting such as a bold yellow signaling the need to further strengthen the precautions. The next higher horizontal layer S1 which corresponds to the contour of the relief exceeding for example by more than 1500 feet the short term predicted altitude for the aircraft is colored in a color that is yet more attention attracting such as a red signaling the need for extreme attention. For the lower layers, the green color for example is used with a weaker and weaker intensity since they do not present short term risks of collision.

The display shows the visible fringes of the various terrain layers. It appears in section in FIG. 2 as R on the abscissa axis.

As a variant, it is possible to adopt, as display altitude reference, the level RefAlt2 corresponding to the instantaneous altitude of the aircraft A. Subsequently, it suffices to maintain that the horizontal terrain layers used for the altimetric representation by level curves of the terrain overflown may be defined with respect to an absolute altitude reference (TED representation) or with respect to a relative altitude reference related to the aircraft (THD representation) but that, most particularly in the second case, the choice of the false colors and/or of the various textures and/or of the various symbols assigned to the various layers is done with respect to a relative altitude reference related to the aircraft and which is designated here by display altitude reference RefAlt.

The situation represented in FIG. 2 is that of an aircraft descending along a trajectory T of angle of slope FPA (the acronym standing for the expression "Flight Path Angle"). Having arrived at the point MC, the terrain anticollision equipment of the aircraft A generates a prealarm of risk of terrain collision since its most distant protection envelope adopted EC begins to encounter the relief at a distance less than or equal to a distance MTCD corresponding to a minimum safety margin maintained to take account of the inaccuracies of the altimetric data base 3 and of the vertical position of the airplane as provided by the onboard sensors, as well as of a minimum overfly height to ensure safety.

Having arrived at the point MW, the terrain anticollision equipment of the aircraft A generates an alarm of risk of terrain collision since the closest protection envelope adopted EW is in its turn at a distance from the relief less than or equal to the distance MTCD.

This terrain collision alarm leads the crew of the aircraft to stop the descent and to instigate without delay an avoidance trajectory TE consisting of a climb back to a safety altitude above the high points of the relief overflown.

When the crew of the aircraft has chosen or when the system installed uses, for the display device of the terrain anticollision equipment, a reference display altitude RefAlt corresponding to the short term predicted altitude for the aircraft, this being natural since one is dealing with the prevention of short term risks of terrain collision, this choice which is indeed suitable up to the appearance of a risk of terrain collision and, upon this appearance of the risk of terrain collision, to the evaluation of the effectiveness of the avoidance maneuver to be implemented, does not make it possible to use the display screen 6 to ascertain the instant at which the avoidance maneuver may be stopped and the normal route resumed without the risk of terrain collision reappearing. Specifically, when the terrain layers displayed all go to a less alerting color such as green, this signifies only that the short term predicted position for the aircraft will pass above the safety altitude if the avoidance maneuver is continued. In order for the display screen 6 to be able to allow the crew to ascertain the instant at which the normal route may be resumed, it would be necessary for it to change the reference display altitude so as to give it the value of the instantaneous altitude of the aircraft. Such a change is difficult to request of a crew of an aircraft at the crucial instant of resolution of a risk of terrain collision.

It is proposed that this problem be solved by endowing the altimetric display device 6 with terrain anticollision equipment 1, with automatic means of adjustment that vary the reference display altitude, when a risk of terrain collision is detected, as a function of the slopes of the trajectory of the aircraft at the instant of detection of the risk of terrain collision and at the present instant, and of its instantaneous value with respect to the instantaneous altitude of the aircraft and/or with respect to an altitude predicted for the aircraft, in a movable range delimited by the altitude of the aircraft and the short term predicted altitude altitude for the aircraft at the instant of detection of the risk of terrain collision.

The flowchart illustrated by FIGS. 3a, 3b, 3c and 3d gives an exemplary method usable by the means of adjustment to alter, advantageously in an automatic and progressive manner, in the course of a relief avoidance maneuver, the value of the reference display altitude, from the value of the short term predicted altitude for the aircraft to the value of the instantaneous altitude of the aircraft, so that the screen of the display device 6 of the terrain anticollision equipment also advises as to the possibility of ending the avoidance maneuver.

Figure 3A:
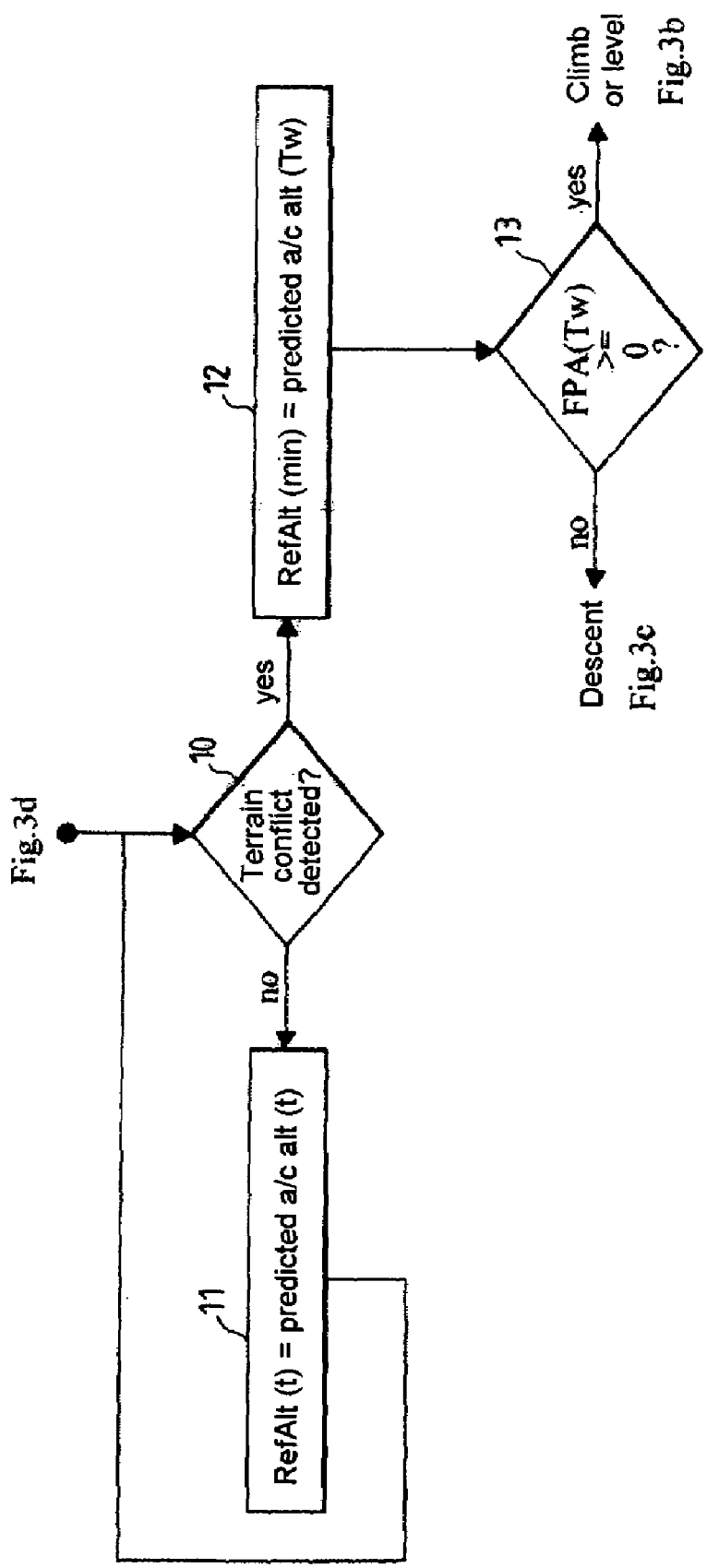

This method comprises various steps:

The first step shown in FIG. 3a consists in verifying at 10 whether a conflict of terrain is detected by the terrain anticollision equipment.

If no terrain conflict is detected by the terrain anticollision equipment, the reference display altitude "RefAlt(t)" is taken equal to the short term predicted altitude for the aircraft "predicted a/c alt(t)" (rectangle 11). Then there is a loopback to the input to monitor the possible detection of a terrain conflict.

If a terrain conflict is detected by the terrain anticollision equipment, an auxiliary altitude variable "RefAlt(min)" representing a minimum value of the reference altitude is updated to the value of the short term predicted altitude of the aircraft at the moment of the detection of the risk of terrain collision "predicted a/c Alt(Tw)" (rectangle 12).

The second step also illustrated in FIG. 3a consists, when a risk of terrain collision has been detected, in distinguishing between two flight altitudes, a first corresponding to an aircraft climbing or holding level and a second corresponding to an aircraft descending. This distinction is done by verification at 13 of the sign of the angle of slope of the speed vector of the aircraft at the moment of the detection of the risk of terrain collision "FPA(Tw)" and leads to two distinct processing branches.

Figure 3B:
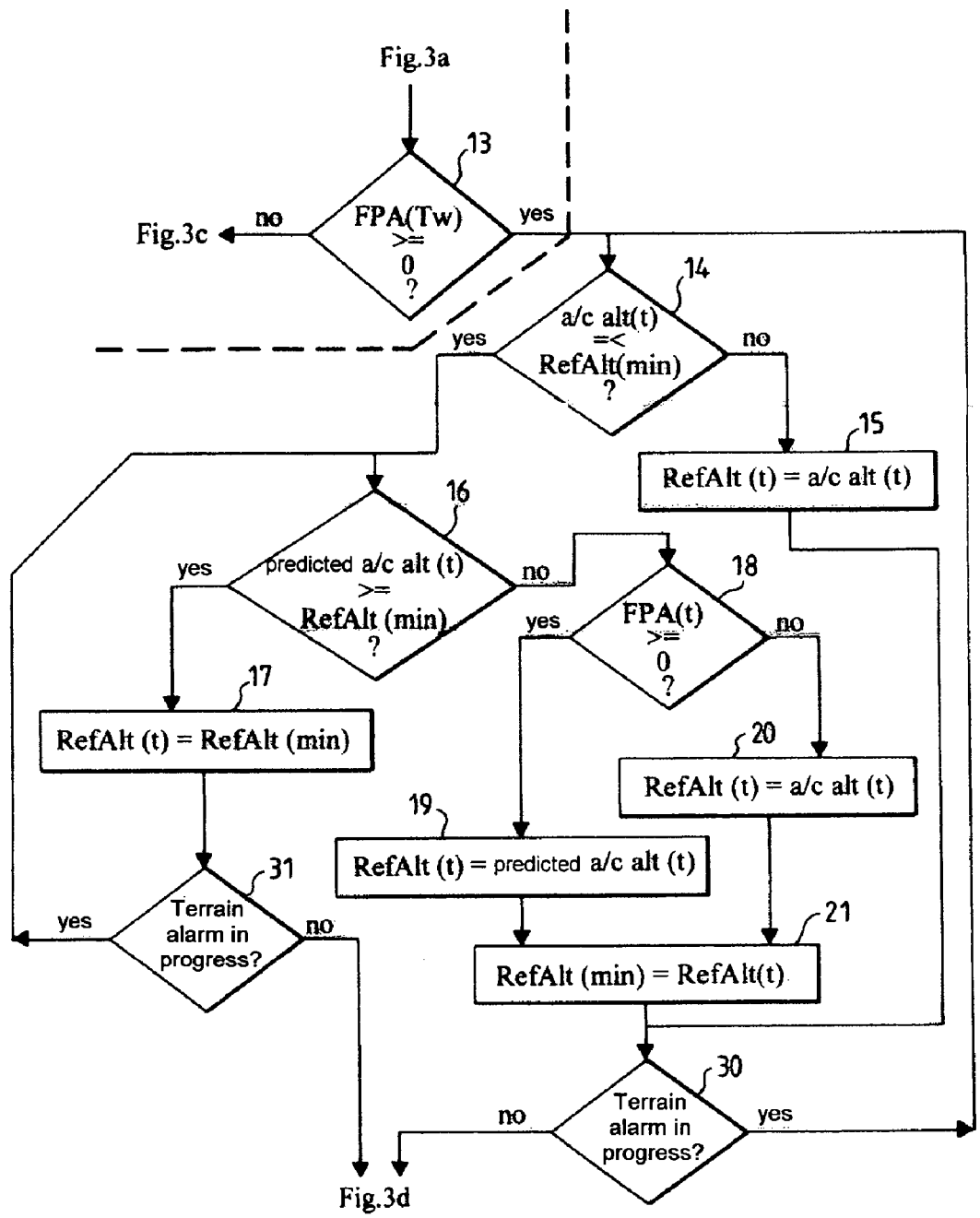

First Branch Illustrated in FIG. 3b Relating to an Aircraft Climbing or Holding Level When the aircraft is climbing or holding level at the moment of the detection of a risk of terrain collision, the second step is followed by a step,of comparison of the instantaneous altitude of the aircraft "a/c alt(t)" with the auxiliary altitude variable "RefAlt(min)" (diamond 14).

As long as the instantaneous altitude of the aircraft is greater than the value of the auxiliary altitude variable (a/c alt(t)>RefAlt(min)) and as long as the alarm due to the detection of a risk of terrain collision is in progress (diamond 30), the reference display altitude "RefAlt(t)" is taken equal to the value of the instantaneous altitude of the aircraft "a/c alt(t)" (rectangle 15).

As long as the instantaneous altitude is less than or equal to the value of the auxiliary altitude variable (a/c alt(t) <=RefAlt(min)) and as long as the alarm due to the detection of a risk of terrain collision is in progress (diamond 31), the step of comparison of the instantaneous altitude of the aircraft "a/c alt(t)" with the auxiliary altitude variable "RefAlt(min)" (diamond 14) is supplemented with a step of monitoring the rate of climb of the aircraft.

This step of monitoring the rate of climb of the aircraft consists of a comparison at 16 of the auxiliary altitude variable "RefAlt(min)" with the short term predicted altitude for the aircraft "predicted a/c alt(t)" which is always greater than the minimum altitude reached by the short term predicted altitude for the aircraft if the aircraft has increased its rate of climb.

As long as the short term predicted altitude for the aircraft "predicted a/c alt(t)" is greater than the altitude "RefAlt (min) (predicted a/c alt(t)≧RefAlt(min)) and as long as the alarm due to the detection of a risk of terrain collision is in progress (diamond 31), the reference display altitude "RefAlt(t)" is taken equal to the auxiliary altitude variable "RefAlt(min)" (rectangle 17) and the comparison at 16 of the short term predicted altitude for the aircraft "predicted a/c alt(t)" with the auxiliary altitude variable "RefAlt(min)" repeated.

As long as the short term predicted altitude for the aircraft "predicted a/c alt(t)" is less than or equal to the altitude "RefAlt (min)" (predicted a/c alt(t)<RefAlt(min)) and as long as the alarm due to the detection of a risk of terrain collision is in progress (diamond 30), the step of monitoring the rate of climb of the aircraft (diamond 16) is supplemented with a step of verification of the continuation of the climb of the aircraft.

This step of verification of the continuation of the climb of the aircraft consists in verifying at 18 the sign of the angle of slope of the speed vector of the aircraft FPA(t).

If the aircraft is still climbing or holding level (FPA(t) >=0), the reference display altitude "RefAlt(t)" is taken equal to the short term predicted altitude for the aircraft "predicted a/c alt(t)" (rectangle 19).

If the aircraft is descending (FPA(t)<0), the reference display altitude "RefAlt(t)" is taken equal to the value of the instantaneous altitude of the aircraft "a/c alt(t)" (rectangle 20).

In both cases, the new value adopted for the reference display altitude "RefAlt(t)" is used to update the auxiliary altitude variable "RefAlt(min)" (rectangle 21) before returning to the step of comparison of the instantaneous altitude of the aircraft "a/c alt(t)" with the auxiliary altitude variable "RefAlt(min)" (diamond 14) as long as the alarm due to the detection of a risk of terrain collision is in progress (diamond 30).

The cessation of the terrain collision alarm causes an exit from the loops for adjusting the reference display altitude "RefAlt(t)" (diamonds 30 and 31) and the adjustment of the value of the reference display altitude "RefAlt(t)" either to that of the short term predicted altitude for the aircraft "predicted a/c alt(t)" if the aircraft is descending, or to that of the instantaneous altitude of the aircraft "a/c alt(t)" if the aircraft is holding level or climbing.

Figure 3C:
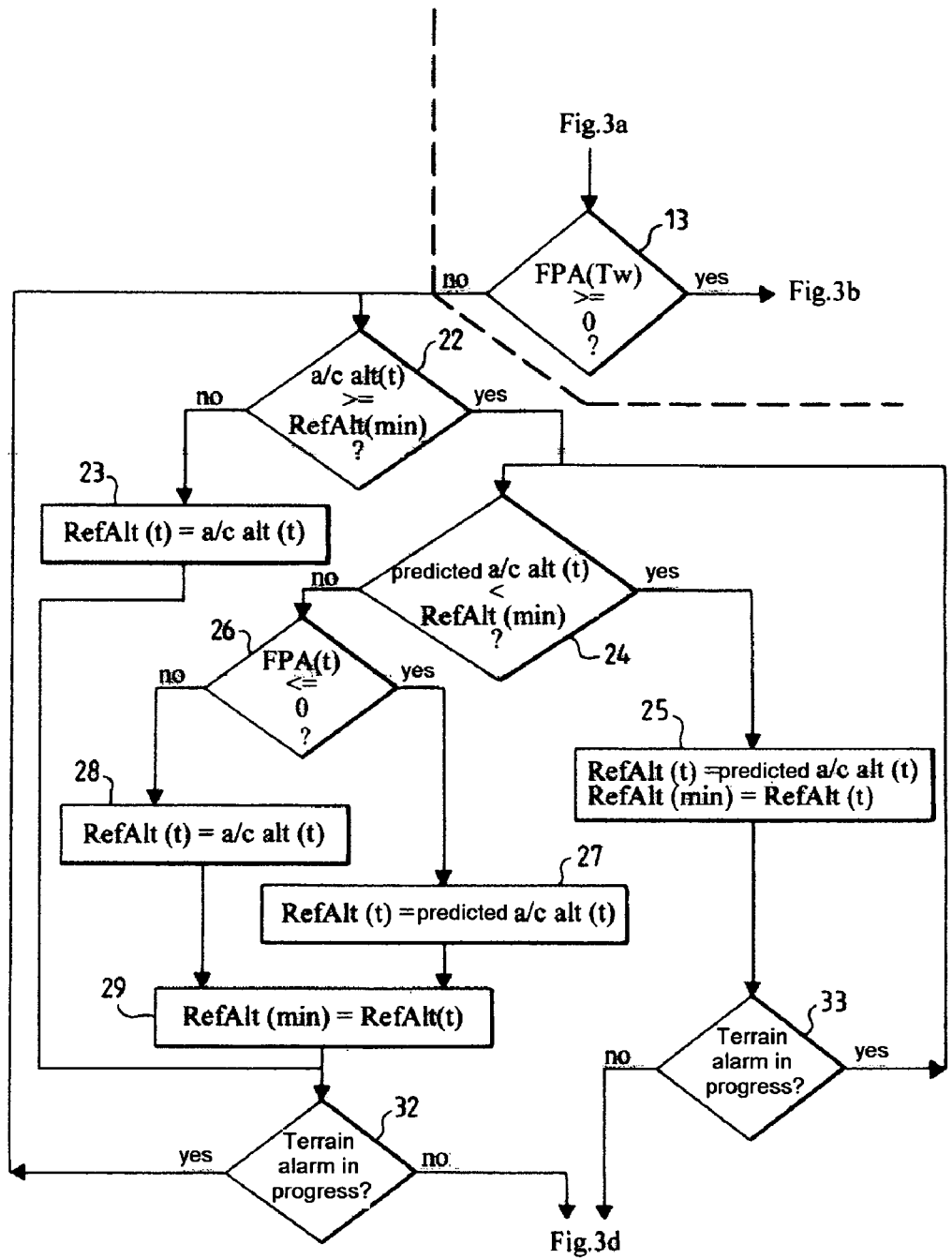
Figure 3D:
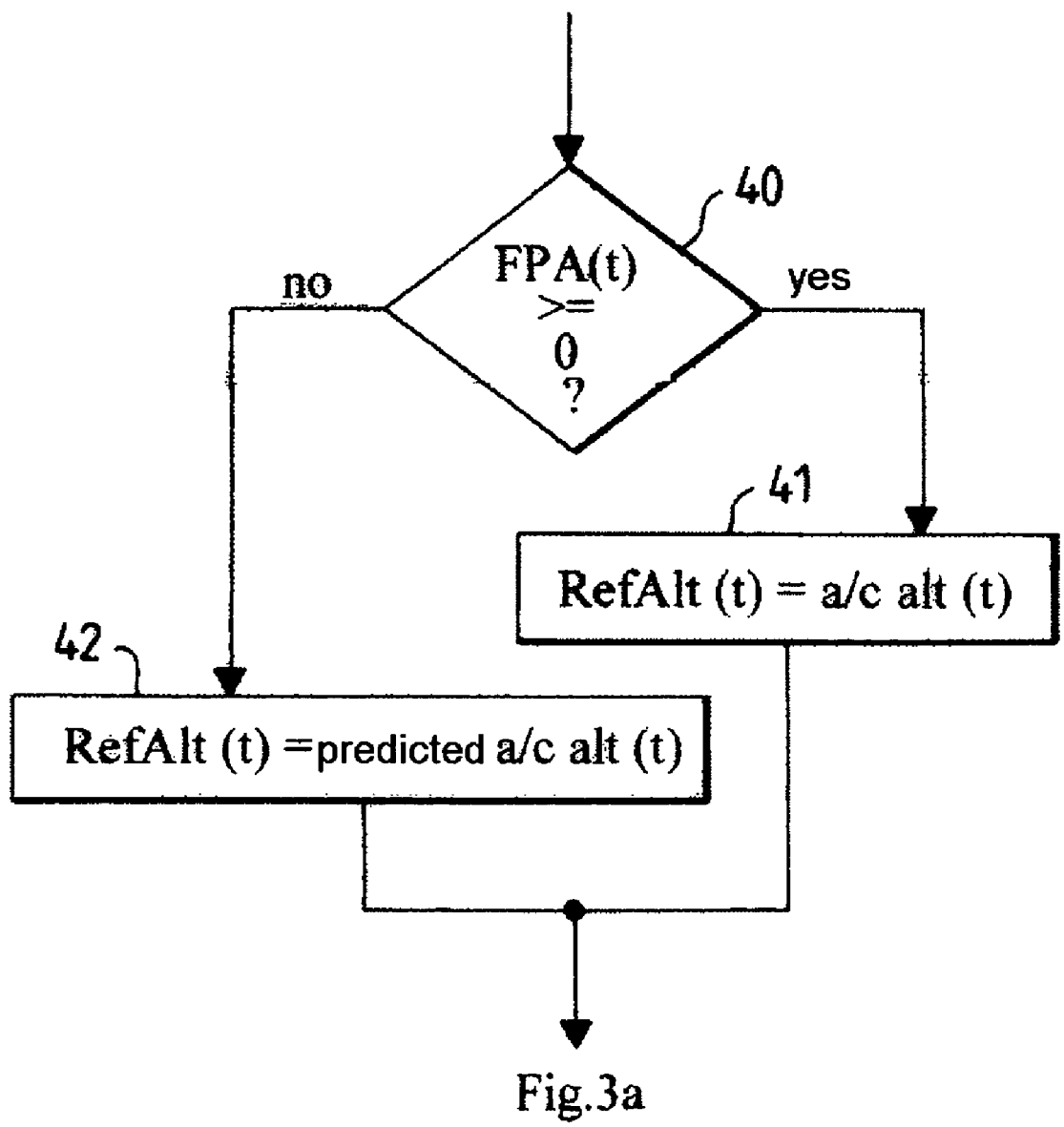

This choice in the absence of detection of terrain conflict forms the subject of the logic flowchart portion shown in FIG. 3d which comprises a step of detection of the sign of the instantaneous slope "FPA(t)" of the trajectory of the aircraft (diamond 40) followed by the adoption, for the reference display altitude "RefAlt(t)", of the value of the instantaneous altitude of the aircraft "a/c alt(t)" in the case of a positive or zero instantaneous slope "FPA(t)" (rectangle 41) or of the value of the short term predicted altitude "predicted a/c alt(t)" in the case of a negative instantaneous slope "FPA(t)".

This choice having been made, there is a loopback to the input (FIG. 3b) to monitor the possible detection of a terrain conflict.

Second Branch Illustrated in FIG. 3c Relating to an Aircraft Descending

When the aircraft is descending at the moment of the detection of a risk of terrain collision, the second step is followed by a step of comparison of the instantaneous altitude of the aircraft "a/c alt(t)" with the auxiliary altitude variable "RefAlt(min)" (diamond 22).

As long as the aircraft is descending with an instantaneous altitude less than the value of the auxiliary altitude variable (a/c alt(t)<RefAlt(min)) and as long as the alarm due to the detection of a risk of terrain collision is in progress (diamond 32), the reference display altitude "RefAlt(t)" is taken equal to the value of the instantaneous altitude of the aircraft "a/c alt(t)" (rectangle 23).

As long as the aircraft is descending with an instantaneous altitude greater than or equal to the value of the auxiliary altitude variable (a/c alt(t)>=RefAlt(min)) and as long as the alarm due to the detection of a risk of terrain collision is in progress (diamond 32), the step of comparison of the instantaneous altitude of the aircraft "a/c alt(t)" with the auxiliary altitude variable "RefAlt(min)" (diamond 22) is supplemented with a step of monitoring the rate of descent of the aircraft.

This step of monitoring the rate of descent of the aircraft consists of a comparison at 24 of the auxiliary altitude variable "RefAlt(min)" with the short term predicted altitude for the aircraft "predicted a/c alt(t)" which is always less than the minimum altitude reached by the short term predicted altitude for the aircraft if the aircraft has increased its rate of descent.

As long as the short term predicted altitude for the aircraft "predicted a/c alt(t)" is less than or equal to the altitude "RefAlt(min) (predicted a/c alt(t)=<RefAlt(min)) and as long as the alarm due to the detection of a risk of terrain collision is in progress (diamond 33), the reference display altitude "RefAlt(t)" is taken equal to the short term predicted altitude for the aircraft "predicted a/c alt(t)" while the auxiliary altitude variable "RefAlt(min)" is updated to the new value adopted for the reference display altitude "RefAlt(t)" (rectangle 25) and the comparison at 24 of the short term predicted altitude for the aircraft "predicted a/c alt(t)" with the auxiliary altitude variable "RefAlt(min)" repeated.

As long as the short term predicted altitude for the aircraft "predicted a/c alt(t)" is greater than the altitude "RefAlt" (min) (predicted a/c alt(t)>RefAlt(min)) and as long as the alarm due to the detection of a risk of terrain collision is in progress (diamond 32), the step of monitoring the rate of descent of the aircraft (diamond 24) is supplemented with a step of verification of the continuation of the descent of the aircraft.

This step of verification of the continuation of the descent of the aircraft consists in verifying at 26 the sign of the angle of slope of the speed vector of the aircraft FPA(t).

If the aircraft is still descending or holding level (FPA(t) <=0), the reference display altitude "RefAlt(t)" is taken equal to the short term predicted altitude for the aircraft "predicted a/c alt(t)" (rectangle 27).

If the aircraft is climbing (FPA(t)>0), the reference display altitude "RefAlt(t)" is taken equal to the value of the instantaneous altitude of the aircraft "a/c alt(t)" (rectangle 28).

In both cases, the new value adopted for the reference display altitude "RefAlt(t)" is used to update the auxiliary altitude variable "RefAlt(min)" (rectangle 29) before returning to the step of comparison of the instantaneous altitude of the aircraft "a/c alt(t)" with the auxiliary altitude variable "RefAlt(min)" (diamond 22) as long as the alarm due to the detection of a risk of terrain collision is in progress (diamond 32).

The cessation of the terrain collision alarm causes an exit from the loops for adjusting the reference display altitude "RefAlt(t)" (diamonds 32 and 33) and the adjustment of the value of the reference display altitude "RefAlt(t)" either to that of the short term predicted altitude for the aircraft "predicted a/c alt(t)" (rectangle 11) if the aircraft is descending, or to that of the instantaneous altitude of the aircraft "a/c alt(t)" if the aircraft is holding level or climbing by following the logic flowchart portion which is shown in FIG. 3d and which has already been described.

This choice having been made, there is a loopback to the input (FIG. 3b) to monitor the possible detection of a terrain conflict.

Periodically at the start of certain cycles of refreshing of the image shown on the display screen, the value of the reference altitude taken into account for the generation of the image is updated to the value provided by the means of adjustment of the reference display altitude.

The means of adjustment of the reference display altitude may follow logic processes other than that just given as an example. They may even follow a very simplified logic process that boils down to switching the reference display altitude, either at the moment of the detection of a risk of terrain collision, from a value related to the short term predicted altitude for the aircraft to the value of the instantaneous altitude of the aircraft, or, at the moment of the disappearance of the risk of terrain collision, from a value related to the instantaneous altitude of the aircraft to the value of the short term predicted altitude for the aircraft.

The means of adjustment of the reference display altitude may also perform a gentle switching onward of the moment of the disappearance of a risk of terrain collision, between the value of the altitude related to the instantaneous altitude (a/c alt(t)) of the aircraft and the value of the short term predicted altitude for the aircraft (predicted a/c alt(Tw)).

When they proceed to the determination of the instantaneous value of the reference display altitude by implementing the method just described, the means of adjustment of the reference display altitude ensure a gentle transition, with no visible jerks on the screen, between a display of map referenced with respect to the short term altitude forecast for the aircraft, this being well suited to terrain anticollision equipment in the absence of detection of risk of collision, and a display of map referenced with respect to the instantaneous altitude of the aircraft better suited to the purpose of resolution by avoidance, of a risk of terrain collision.

The means of adjustment of the instantaneous value of the reference display altitude may be embodied in the form of a specific logic circuit or by means of software whose execution is entrusted to the computer of the terrain anticollision equipment.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A display device for terrain anticollision equipment carried onboard an aircraft detecting the risks of collision of the aircraft with the terrain and/or ground obstacles by comparison, of at least one protection envelope constructed around the short term predicted trajectory of the aircraft, with a representation of an envelope of the terrain and/or of the ground obstacles overflown and by detection of the intrusion, into the said protection envelope or envelopes, of the terrain and/or of the ground obstacles overflown, said display device displaying, on one or more screens installed onboard, an image representing in at least two dimensions of the envelope of the terrain and/or of the obstacles, in the form of superposed slices assigned false colors and/or various textures and/or symbols referenced with respect to a reference display altitude, and comprising:
   means for adjustment that vary the reference display altitude when a risk of terrain collision is detected as a function of:
   the slopes of the trajectory of the aircraft at the instant of detection of a risk of terrain collision and at the present instant,
   a short term predicted altitude for the aircraft; and
   the instantaneous altitude of the aircraft.

2. The device as claimed in claim 1, wherein the means for adjustment of the reference display altitude switch instantaneously, at the moment of the detection of a risk of terrain collision, between the value of the altitude related to the short term predicted altitude for the aircraft and the instantaneous altitude of the aircraft.

3. The device as claimed in claim 2, wherein the switching of the means for adjustment is triggered at the start of a next cycle of refreshing of the image on the screen or is displayed the image.

4. The device as claimed in claim 1, wherein the means for adjustment of the reference display altitude provide for a gentle transition, onward of the moment of the detection of a risk of terrain collision, between the value of the short term predicted altitude for the aircraft and the altitude related to the altitude of the aircraft.

5. The device as claimed in claim 1, wherein the means for adjustment of the reference display altitude initially give the reference display altitude, at the moment of the detection of a risk of terrain collision, the value of the short term predicted altitude for the aircraft.

6. The device as claimed in claim 1, wherein, if aircraft was climbing or holding level at the moment of the detection of a risk of terrain collision and maintains or accentuates the climb after the detection of the risk of terrain collision, the means for adjustment of the reference display altitude fix the value of the reference display altitude at value at the moment.

7. The device as claimed in claim 1, wherein, if the aircraft was climbing or holding level at the moment of the detection of a risk of terrain collision and attenuates the climb after the detection of the risk of terrain collision, the means for adjustment of the reference display altitude slave the reference display value to the value of the short term predicted altitude for the aircraft.

8. The device as claimed in claim 1, wherein, if the aircraft was climbing or holding level at the moment of the detection of a risk of terrain collision and begins to descend, the means for adjustment of the reference display altitude slave the value of the reference display altitude to the instantaneous value of the altitude of the aircraft.

9. The device as claimed in claim 1, wherein, if the aircraft was climbing or holding level at the moment of the detection of a risk of terrain collision and when the instantaneous altitude becomes greater than the last value taken by the reference display altitude, the means for adjustment of the reference display altitude slave the value of the reference display altitude to the instantaneous value of the altitude of the aircraft.

10. The device as claimed in claim 1, wherein, if the aircraft was descending at the moment of the detection of a risk of terrain collision and accentuates its descent after the detection of the risk of terrain collision, the means for adjustment of the reference display altitude slave the value of the reference display altitude to the value of the short term predicted altitude for the aircraft.

11. The device as claimed in claim 1, wherein, if the aircraft was descending at the moment of the detection of a risk of terrain collision and attenuates the descent after the detection of the risk of terrain collision, the means for adjustment of the reference display altitude slave the reference display value to the value of the short term predicted altitude of the aircraft.

12. The device as claimed in claim 1, wherein, if the aircraft was descending at the moment of the detection of a risk of terrain collision and begins to climb, the means for adjustment of the reference display altitude slave the value of the reference display altitude to the instantaneous value of the altitude of the aircraft.

13. The device as claimed in claim 1, wherein, if the aircraft was descending at the moment of the detection of a risk of terrain collision and when the instantaneous altitude becomes less than the last value taken by the reference display altitude, the means for adjustment of the reference display altitude slave the value of the reference display altitude to the instantaneous value of the altitude of the aircraft.

14. The device as claimed in claim 1, wherein the means for adjustment of the reference display altitude switch instantaneously, at the moment of the disappearance of a risk of terrain collision, between the value of the altitude related to the instantaneous altitude of the aircraft and the value of the short term predicted altitude for the aircraft.

15. The device as claimed in claim 14, wherein the switching of the means for adjustment is triggered at the start of a next cycle of refreshing of the image on the screen or is displayed the image.

16. The device as claimed in claim 1, wherein the means for adjustment of the reference display altitude allow a gentle switching, onward of the moment of the disappearance of a risk of terrain collision, between the value of the altitude related to the instantaneous altitude of the aircraft and the value of the short term predicted altitude for the aircraft.

* * * * *